UNITED STATES PATENT OFFICE.

HENRY BLUMENBERG, JR., OF ORO GRANDE, CALIFORNIA.

TOXIC CEMENT.

1,296,468.    Specification of Letters Patent.    Patented Mar. 4, 1919.

No Drawing.    Application filed May 31, 1918. Serial No. 237,611.

*To all whom it may concern:*

Be it known that I, HENRY BLUMENBERG, Jr., a citizen of the United States, residing at Oro Grande, in the county of San Bernardino and State of California, have invented new and useful Improvements in Toxic Cement, of which the following is a specification.

My invention relates to a toxic hydraulic cement, especially useful in the manufacture of septic tanks, drains, sewer pipes and the like that are generally laid beneath the surface of the ground, where plant life and animal life in time disintegrate the same, the former owing to the roots going through the concrete and the latter through its larvæ. The roots going through the concrete eventually clog the inner surface of the pipe, besides disintegrating the pipe itself through the expansion of the roots through the pores of the pipe. Furthermore I have found that the cement made in accordance with this invention is far denser and stronger than when the ordinary cement is used. My invention consists in the new composition of matter as hereinafter described and claimed.

I have discovered that by the addition of not more than one-half per cent. of copper sulfate by weight of the dry cement used in making cementitious structures and dissolving the same in water used for making the cementitious mixture, the resulting product is very much harder and has a higher tensile strength than the ordinary cement without the addition of copper sulfate. When more than one-half per cent. of copper sulfate is used, it retards the setting of the cement too long, but the copper sulfate may be used in considerably larger quantities, provided the same is mixed in a granulated form with the concrete.

In place of dissolving the copper sulfate in the water for making concrete and the like, the same may be mixed with a clinker and ground therewith or may be mixed with a dry cement at any stage of its manufacture.

In place of copper sulfate any other copper salt may be used, also other toxic salts such as the compounds of arsenic, barium carbonate, salts of mercury, zinc sulfate and the like, which do not interfere with the setting of the cement for practical purposes or otherwise render the same inferior in other respects, such as density, hardness or strength. However, I have found that copper sulfate used as described, gives the strongest and best concrete.

While the preferred method is to add the toxic compound to the cement either in the dry cement or in the concrete, the toxic compound may be applied after the concrete cementitious structure has set, by means of a solution by spraying or brushing, or any other suitable means.

Various changes in the steps of my process may be made by those skilled in the art without departing from the spirit of my invention, as claimed.

The copper sulfate, it will be understood, does not remain as such in the cement after the same is mixed with water, but forms copper hydroxid whose toxic qualities are well known. The cement thus treated is especially suitable for building ships and the like, as it will effectually prevent both animal and plant marine growth on the sides of the ship.

I claim:

A composition of matter consisting of hydraulic cement and copper sulfate not exceeding one-half per cent. of the mass.

In testimony whereof I have signed my name to this specification.

HENRY BLUMENBERG, JR.

Copies of this patent may be obtained for five cents each, by addressing the "Commissioner of Patents, Washington, D. C."